(12) United States Patent
Lampe et al.

(10) Patent No.: US 10,457,400 B2
(45) Date of Patent: Oct. 29, 2019

(54) MIXING DEVICE WITH REDUCED RISK OF ICING

(71) Applicant: Airbus Operations GmbH, Hamburg (DE)

(72) Inventors: Dietrich Lampe, Dresden (DE); Thomas Scherer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 817 days.

(21) Appl. No.: 14/310,381

(22) Filed: Jun. 20, 2014

(65) Prior Publication Data
US 2014/0302765 A1    Oct. 9, 2014

Related U.S. Application Data

(63) Continuation of application No. PCT/EP2012/076173, filed on Dec. 19, 2012.
(Continued)

(30) Foreign Application Priority Data

Dec. 20, 2011    (DE) .................. 10 2011 121 721

(51) Int. Cl.
*B64D 13/06*    (2006.01)
*B64D 13/08*    (2006.01)

(52) U.S. Cl.
CPC ............ *B64D 13/08* (2013.01); *B64D 13/06* (2013.01); *B64D 2013/0666* (2013.01); *B64D 2013/0688* (2013.01); *Y02T 50/56* (2013.01)

(58) Field of Classification Search
CPC ........ B64D 13/00; B64D 15/02; B64D 13/06; B64D 13/08; F24F 13/04
(Continued)

(56) References Cited

U.S. PATENT DOCUMENTS

| 2,884,846 A | 5/1959 | Goodman et al. |
| 2005/0061019 A1 | 3/2005 | McColgan et al. |

(Continued)

FOREIGN PATENT DOCUMENTS

| DE | 102006037539 | 2/2008 |
| DE | 102007002138 | 7/2008 |

(Continued)

OTHER PUBLICATIONS

International Search Report, dated Mar. 5, 2013.

*Primary Examiner* — Steven B McAllister
*Assistant Examiner* — Ko-Wei Lin
(74) *Attorney, Agent, or Firm* — Greer, Burns & Crain, Ltd.

(57) ABSTRACT

A mixing device that is particularly suitable for use in an aircraft air-conditioning system comprising a cold air supply line adapted to supply cold air to the mixing device. A first recirculation air supply line is adapted to supply recirculation air to the mixing device. A mixing chamber is connected to the cold air supply line and the first recirculation air supply line and is adapted to supply the cold air supplied to the mixing device via the cold air supply line with the recirculation air supplied to the mixing device via the first recirculation air supply line. The first recirculation air supply line has a heat transfer portion which is thermoconductively connected to an area of a wall delimiting the mixing chamber that is at risk of icing.

11 Claims, 3 Drawing Sheets

Related U.S. Application Data

(60) Provisional application No. 61/577,763, filed on Dec. 20, 2011.

(58) Field of Classification Search
USPC ........ 454/76, 141–142, 121–126; 165/41–44
See application file for complete search history.

(56) References Cited

U.S. PATENT DOCUMENTS

| | | | |
|---|---|---|---|
| 2008/0210816 A1* | 9/2008 | Feisthammel | B01F 3/02 244/118.5 |
| 2008/0251592 A1 | 10/2008 | Baldauf | |
| 2009/0165878 A1 | 7/2009 | Krakowski et al. | |
| 2009/0217681 A1 | 9/2009 | Solntsev et al. | |

FOREIGN PATENT DOCUMENTS

| | | | | |
|---|---|---|---|---|
| DE | 102009003937 | | 7/2010 | |
| DE | 102010014354 | * | 10/2011 | ............. B64D 13/00 |
| EP | 1964775 | | 9/2008 | |
| GB | 671567 | | 5/1952 | |
| WO | 2007115810 | | 10/2007 | |

\* cited by examiner

MIXING DEVICE WITH REDUCED RISK OF ICING

CROSS-REFERENCES TO RELATED APPLICATIONS

This application is a continuation of International Application PCT/EP2012/076173 filed Dec. 19, 2012, designating the United States and published on Jun. 27, 2013 as WO 2013/092727. This application also claims the benefit of the U.S. Provisional Application No. 61/577,763, filed on Dec. 20, 2011, and of the German patent application No. 10 2011 121 721.9, filed on Dec. 20, 2011, the entire disclosures of which are incorporated herein by way of reference.

BACKGROUND OF THE INVENTION

The present invention relates to a mixing device suitable for use in an aircraft air-conditioning system, and to a method of operating such a mixing device.

In a modern aircraft the passenger cabin, or sections of the passenger cabin, the freight compartment, or sections of the freight compartment, and the cockpit constitute different climate zones, which are conventionally air-conditioned, both in flight and on the ground, by means of an air-conditioning system specific to aircraft. Furthermore, the aircraft air-conditioning system is utilized to dissipate heat from heat-generating components on board the aircraft, e.g., electrical or electronic components. In the air-conditioning units of the aircraft air-conditioning system, the hot compressed air drawn in from the aircraft's engine compressors or auxiliary engine compressors is expanded and cooled to a desired low temperature.

The air processed in the air-conditioning units is fed as cooled fresh air to a mixing device, where it is mixed with recirculation air sucked out of an air-conditioned area of the aircraft, e.g., the passenger cabin. The mixed air produced in the mixing device, made up of cold fresh air processed by the air-conditioning units and recirculation air sucked out of an air-conditioned area of the aircraft, is ultimately utilized to air-condition the different climate zones of the aircraft. If the climate zones of the aircraft have to be cooled, the cold fresh air produced by the air-conditioning units is fed to the mixing device, often at a temperature of <0° C. Consequently, because of the moisture contained in the fresh air and/or recirculation air, ice or snow can accumulate in the mixing device or the ducts connected to the mixing device.

It is known from DE 10 2006 037 539 A1 that fresh air lines through which cold fresh air flows from the air-conditioning units of an aircraft air-conditioning system are protected from icing by the introduction of warm drawn-in engine air, controlled by trim valves.

DE 10 2009 003 937 A1, on the other hand, teaches that, to reduce the risk of icing in ducts through which cold fresh air flows in an aircraft air-conditioning system, the geometry of the ducts shall be designed in such a way as to avoid the creation of areas in which a fresh air stream passed through the ducts has a reduced flow velocity, especially in ducts with a small cross-section of flow.

Finally, DE 10 2010 014 354 A1 describes a mixing device suitable for use in an aircraft air-conditioning system, where premixing cold air fed to the mixing device in a first premixing chamber, and premixing warm air fed to the mixing device in a second premixing chamber, can improve the mixing quality and thereby minimize the accumulation of ice or snow in the mixing device, or the ducts connected to the mixing device, due to inadequate mixing of the air streams fed to the mixing device.

SUMMARY OF THE INVENTION

An object of the invention is to provide a mixing device suitable for use in an aircraft air-conditioning system, and a method of operating such a mixing device, which make it possible in an energy-efficient manner to reduce the risk of accumulation of ice or snow in the mixing device.

A mixing device that is particularly suitable for use in an aircraft air-conditioning system comprises a cold air supply line adapted to supply cold air to the mixing device. The cold air to be supplied to the mixing device may be produced, e.g., by one or more air-conditioning units of the aircraft's air-conditioning system. The mixing device also comprises a first recirculation air supply line adapted to supply recirculation air to the mixing device. The recirculation air supply line may be, e.g., a line that connects the mixing device to an area of the aircraft that is to be air-conditioned, e.g., a passenger cabin or a freight compartment. A mixing chamber of the mixing device is connected to the cold air supply line and the first recirculation air supply line and is adapted to mix the cold air supplied to the mixing device via the cold air supply line with the recirculation air supplied to the mixing device via the first recirculation air supply line.

The first recirculation air supply line has a heat transfer portion which is thermoconductively connected to an area of a wall delimiting the mixing chamber that is at risk of icing. The mixing chamber wall area that is at risk of icing may be, e.g., a wall area around which the velocity of the air flowing through the mixing chamber is less than in other areas, or a wall area onto which the cold air stream exiting the cold air supply line blows directly. To ensure a proper thermoconductive contact between the heat transfer portion of the first recirculation air supply line and the area of the wall delimiting the mixing chamber that is at risk of icing, the heat transfer portion of the first recirculation air supply line and the mixing chamber wall area that is at risk of icing are preferably made of a material that is not too highly insulating. The heat transfer portion of the first recirculation air supply line may be connected directly to the mixing chamber wall area that is at risk of icing. Alternatively, however, another conceivable arrangement is one in which there is only a thermal contact between the heat transfer portion of the first recirculation air supply line and the mixing chamber wall area that is at risk of icing, said contact being effected, e.g., via a heat exchanger or the like. Preferably, the heat transfer portion extends over only part of the length of the first recirculation air supply line.

When an air-conditioning system equipped with the device according to the invention is operated in cooling mode, the temperature of the recirculation air flowing through the first recirculation air supply line is conventionally markedly higher than the temperature of the cold fresh air flowing through the cold air supply line, which is typically below 0° C. For example, the temperature of the recirculation air flowing through the first recirculation air supply line may be >20° C. Consequently, the wall area that is at risk of icing due to the introduction of cold air into the mixing chamber can be heated by the comparatively warm recirculation air flowing through the heat transfer portion of the first recirculation air supply line. This can prevent the formation of thick layers of snow or ice on the heated mixing chamber wall area.

Surprisingly, to prevent the formation of layers of snow or ice on the mixing chamber wall area that is at risk of icing, it is not absolutely necessary to heat the wall area to a temperature of >0° C. before it ices up. Rather, the insulating effect of a layer of snow or ice accumulated on the mixing chamber wall area can actually be utilized to restrict the quantity of heat required to heat the mixing chamber wall area that is at risk of icing. In particular, due to the insulating effect of the accumulated layer of snow or ice, the quantity of heat that has to be transferred from the recirculation air flowing through the heat transfer portion of the first recirculation air supply line to the mixing chamber wall area that is at risk of icing, in order to cause layers of snow or ice accumulated on the mixing chamber wall area to flake off, is the smaller, the thicker the accumulated layer of snow or ice.

The mixing device according to the invention dispenses with the need to introduce additional thermal energy to heat the mixing chamber wall area that is at risk of icing. Rather, the thermal energy already contained in the recirculation air is utilized to heat the mixing chamber wall area that is at risk of icing. The mixing device can therefore be operated in a particularly energy-efficient manner. Furthermore, in an air-conditioning system equipped with the mixing device according to the invention, it is possible to achieve air distribution architectures and geometries that would not be possible with a conventional mixing chamber due to the high risk of icing.

The wall area of the mixing chamber that is at risk of icing may be located in the region of a curve of the mixing chamber that is arranged downstream of an outlet of the cold air supply line into the mixing chamber. In particular, a curved mixing chamber wall area onto which the centrifugal force is directed that acts on the area flowing through the curve of the mixing chamber, i.e., a mixing chamber wall air that defines an external radius of the curved area of the mixing chamber may form the mixing chamber wall area that is at risk of icing. The heat transfer portion of the first recirculation air supply line is then preferably arranged adjacent to the mixing chamber wall area that defines the external radius of the curved mixing chamber area and forms the mixing chamber wall area that is at risk of icing. The mixing device then has a compact structural shape, is comparatively easy to produce and, because it does not need additional heat transfer components, is distinguished by having a low weight.

Preferably, the heat transfer portion of the first recirculation air supply line branches off a main portion of the first recirculation air supply line. In such a configuration of the first recirculation air supply line, the recirculation air flowing through the first recirculation air supply line is divided between the heat transfer portion and the main portion of the first recirculation air supply line, i.e., only part of the recirculation air flowing through the first recirculation air supply line is utilized to transfer thermal energy to the mixing chamber wall area that is at risk of icing. By contrast, the part of the recirculation air that flows through the main portion of the first recirculation air supply line is passed into the mixing chamber without giving up thermal energy to the mixing chamber wall area that is at risk of icing, and is mixed in the mixing chamber with the cold air from the cold air supply line.

Also, the heat transfer portion of the first recirculation air supply line may lead into the mixing chamber downstream of an outlet of the main portion of the first recirculation air supply line into the mixing chamber. Such an arrangement of the first recirculation air supply line has the advantage that only the recirculation air which gives up thermal energy to the mixing chamber wall area that is at risk of icing as it flows through the heat transfer portion of the first recirculation air supply line is passed into the mixing chamber further downstream. By contrast, the recirculation air which flows through the main portion of the first recirculation air supply line is passed into the mixing chamber upstream of the outlet of the heat transfer portion of the first recirculation air supply line into the mixing chamber, so a long mixing length, i.e., a long length of the mixing chamber through which air can flow, is available for the recirculation air from the main portion of the first recirculation air supply line. This makes it possible to ensure a proper thorough mixing of the recirculation air with the cold air from the cold air supply line in the mixing chamber, i.e., to ensure that the mixing device is of high mixing quality.

Preferably, the main portion of the first recirculation air supply line leads into the mixing chamber in the region of an upstream end of the mixing chamber, adjacent to an outlet of the cold air supply line into the mixing chamber. Such a configuration of the mixing device allows optimal utilization of the length of the mixing chamber through which air can flow, and hence makes it possible to achieve an optimal mixing quality.

In one preferred embodiment of the mixing device according to the invention, a mixed air exhaust line connected to the mixing chamber passes through the heat transfer portion of the first recirculation air supply line. Consequently, recirculation air which is passed through the heat transfer portion of the first recirculation air supply line flows around or over the mixed air exhaust line through which mixed air exhausted from the mixing chamber flows. As a result, an area of the mixed air exhaust line that is connected to the mixing chamber, like the mixing chamber wall area that is at risk of icing, is heated by the recirculation air flowing through the heat transfer portion of the first recirculation air supply line, and is thereby also protected from icing.

Preferably, the mixing device further comprises a second recirculation air supply line adapted to supply recirculation air to the mixing device. The second recirculation air supply line may be used, e.g., to supply recirculation air to the mixing device from a climate zone of the aircraft different from that connected to the first recirculation air supply line. For example, the first recirculation air supply line may be connected to a passenger cabin and the second recirculation air supply line to a freight compartment of the aircraft, or vice-versa. It is also conceivable to feed recirculation air to the mixing device via the first and second recirculation air supply lines from different climate zones of the passenger cabin. The second recirculation air supply line is preferably connected to the mixing chamber of the mixing device.

The second recirculation air supply line may comprise a main portion and a coupling portion connected to the heat transfer portion of the first recirculation air supply line. In such an arrangement of the mixing device, recirculation air is supplied to the heat transfer portion of the first recirculation air supply line not only from the first recirculation air supply line, but also from the second recirculation air supply line. Consequently, the heat transfer portion of the first recirculation air supply line can also be supplied with recirculation air when recirculation air is flowing only through the first or only through the second recirculation air supply line. Thus, heating of the mixing chamber wall area that is at risk of icing is assured even when only one of the two recirculation air supply lines is supplying recirculation air.

If desired, the flow of recirculation air from the first and second recirculation air supply lines into the heat transfer portion of the first recirculation air supply line may be controlled by means of suitable valves, which may be arranged, e.g., in the region where the heat transfer portion branches off the main portion of the first recirculation air supply line and/or in the coupling portion of the second recirculation air supply line. If the recirculation air flowing through the first recirculation air supply line is at a different temperature from the recirculation air flowing through the second recirculation air supply line, the temperature of the recirculation air flowing through the heat transfer portion of the first recirculation air supply line may be controlled as desired, e.g., by suitably controlling the valves and hence the flows of recirculation air from the first or second recirculation air supply line into the heat transfer portion of the first recirculation air supply line.

Like the main portion of the first recirculation air supply line, the main portion of the second recirculation air supply line may also lead into the mixing chamber in the region of the upstream end of the mixing chamber, adjacent to the outlet of the cold air supply line into the mixing chamber. Such a configuration in turn allows optimal utilization of the available length of the mixing chamber through which air can flow, and hence makes it possible to optimize the mixing quality.

In a method according to the invention of operating a mixing device that is particularly suitable for use in an aircraft air-conditioning system, cold air is supplied to the mixing device via a cold air supply line. Furthermore, recirculation air is supplied to the mixing device via a first recirculation air supply line. In a mixing chamber, the cold air supplied to the mixing device via the cold air supply line is mixed with the recirculation air supplied to the mixing device via the first recirculation air supply line. An area of a wall delimiting the mixing chamber that is at risk of icing is heated by heat transfer from a heat transfer portion of the first recirculation air supply line which is thermoconductively connected to the mixing chamber wall area that is at risk of icing.

The mixing chamber wall area that is at risk of icing may be heated by heat transfer from a heat transfer portion of the first recirculation air supply line that is arranged adjacent to an external surface of the mixing chamber wall area that is at risk of icing.

Furthermore, the mixing chamber wall area that is at risk of icing may be heated by heat transfer from a heat transfer portion of the first recirculation air supply line that branches off a main portion of the first recirculation air supply line and leads into the mixing chamber downstream of an outlet of the main portion of the first recirculation air supply line.

The supply of recirculation air from the main portion of the first recirculation air supply line into the mixing chamber may take place in the region of an upstream end of the mixing chamber, adjacent to an outlet of the cold air supply line into the mixing chamber.

A mixed air exhaust line connected to the mixing chamber may be heated by heat transfer from the heat transfer portion of the first recirculation air supply line. Preferably, the mixed air exhaust line passes through the heat transfer portion of the first recirculation air supply line. Such an arrangement makes it possible to heat the mixed air exhaust line by heat transfer from the heat transfer portion of the first recirculation air supply line, in the region where said exhaust line branches off the mixing chamber.

Recirculation air may be supplied to the heat transfer portion of the first recirculation air supply line from a second recirculation air supply line. Preferably, the supply of recirculation air from the second recirculation air supply line into the heat transfer portion of the first recirculation air supply line takes place via a coupling portion that branches off a main portion of the second recirculation air supply line.

The supply of recirculation air from the main portion of the second recirculation air supply line into the mixing chamber preferably takes place in the region of the upstream end of the mixing chamber, adjacent to the outlet of the cold air supply line into the mixing chamber.

The above-described mixing device and/or the above-described method of operating a mixing device may be used particularly advantageously in an aircraft air-conditioning system.

BRIEF DESCRIPTION OF THE DRAWINGS

Preferred embodiments of the invention will now be described in greater detail with the aid of the appended schematic drawings, of which

DETAILED DESCRIPTION OF THE PREFERRED EMBODIMENTS

Figure 1:
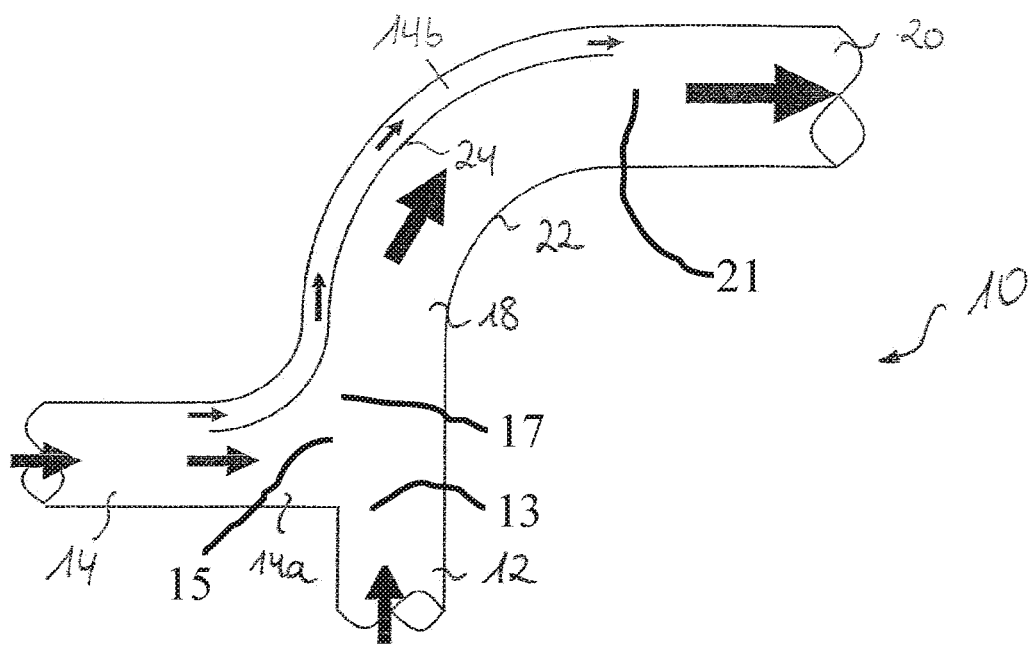
FIG. 1 shows a first embodiment of a mixing device suitable for use in an aircraft air-conditioning system.

A mixing device 10 shown in FIG. 1 comprises a cold air supply line 12 adapted to supply cold air, produced by an air-conditioning unit, to the mixing device 10. The mixing device 10 also comprises a first recirculation air supply line 14 adapted to supply recirculation air to the mixing device 10 from a first climate zone of an air-conditioned area of the aircraft, e.g., a freight compartment, a passenger cabin or a section of the passenger cabin.

The cold air supply line 12 and the first recirculation air supply line 14 are each connected to a mixing chamber 18 of the mixing device 10. In the mixing chamber 18 the cold air supplied via the cold air supply line 12 is mixed with the recirculation air from the first recirculation air supply line 14. When an aircraft air-conditioning system equipped with the mixing device 10 is operated in cooling mode, the cold air is supplied to the mixing chamber 18 via the cold air supply line 12 at a temperature of <0° C., at least in certain operating phases of the mixing device 10. By contrast, the recirculation air supplied to the mixing chamber 18 via the first recirculation air supply line 14 is comparatively warm, i.e., its temperature is above 0° C. and generally above 20° C. The mixed air produced in the mixing chamber 18 is exhausted from the mixing chamber 18 via a mixed air exhaust line 20, at a downstream end 21 of the mixing chamber 18. The mixed air is supplied via the mixed air exhaust line 20 to one or more climate zones of the area of the aircraft that is to be air-conditioned.

Since, as mentioned above, the cold air fed to the mixing chamber 18 via the cold air supply line 12 is at a temperature of <0° C., at least in certain operating phases of the mixing device 10, there is a risk of a layer of snow or ice accumulating, at least in certain areas of a wall 22 delimiting the mixing chamber 18. Such a mixing chamber wall area that is at risk of icing, denoted by 24 in the Figure, may be, e.g., a wall area around which the velocity of the air flowing through the mixing chamber 18 is less than in other areas, or a wall area onto which the cold air stream exiting the cold air supply line 12 blows directly.

In the mixing device 10 illustrated in the Figures, the first recirculation air supply line 14 has a main portion 14a that leads into the mixing chamber 18 in the region of an upstream end 17 of the mixing chamber 18, adjacent to an outlet 13 of the cold air supply line 12 into the mixing chamber 18. A heat transfer portion 14b of the first recirculation air supply line 14 branches off the main portion 14a of the first recirculation air supply line 14. Consequently, recirculation air flowing through the first recirculation air supply line 14 is divided into two partial streams that flow on the one hand through the main portion 14a and on the other hand through the heat transfer portion 14b of the first recirculation air supply line 14.

The heat transfer portion 14b of the first recirculation air supply line 14 is thermoconductively connected to the area 24 of the mixing chamber wall 22 that is at risk of icing. In particular, the heat transfer portion 14b of the first recirculation air supply line 14 extends adjacent to an external surface of the mixing chamber wall area 24 that is at risk of icing. This produces a direct thermal contact between the heat transfer portion 14b of the first recirculation air supply line 14 and the mixing chamber wall area 24 that is at risk of icing. Consequently, thermal energy can be transferred from the recirculation air flowing through the heat transfer portion 14b of the first recirculation air supply line 14, which is at a higher temperature than the cold air fed to the mixing device 10 via the cold air supply line 12, to the mixing chamber wall area 24 that is at risk of icing. To ensure a transfer of thermal energy from the heat transfer portion 14b of the first recirculation air supply line 14 to the mixing chamber wall area 24 that is at risk of icing, both the heat transfer portion 14b of the first recirculation air supply line 14 and the mixing chamber wall area 24 that is at risk of icing are made of a material that is not too highly insulating.

The heat transfer portion 14b of the first recirculation air supply line 14 leads into the mixing chamber 18 downstream of the outlet 15 of the main portion 14a of the first recirculation air supply line 14. Such a configuration of the mixing device 10 ensures that, for the recirculation air which is supplied to the mixing chamber 18 via the main portion 14a of the first recirculation air supply line 14, the whole of the available mixing length, i.e., the whole length of the mixing chamber 18 through which air can flow, is available for mixing with the cold air from the cold air supply line 12. This ensures a good thorough mixing of the recirculation air with the cold air from the cold air supply line 12, i.e., a high mixing quality.

The thermal energy provided by the recirculation air flowing through the heat transfer portion 14b of the first recirculation air supply line 14, and transferred to the mixing chamber wall area 24 that is at risk of icing and to the portion of the mixed air exhaust line 20 around which the recirculation air flows, is sufficient to markedly minimize the risk of layers of snow or ice forming in the areas heated by the recirculation air, or to completely prevent these areas from icing. The mixing chamber wall area 24 that is at risk of icing does not need to be heated to a temperature of >0° C. before the accumulation of a layer of snow or ice in order for the mixing device 10 to function properly. Rather, the design of the mixing device 10 makes it possible to utilize the insulating effect of a layer of snow or ice that has already accumulated on the mixing chamber wall area 24 such that the thicker an already accumulated layer of snow or ice is, the smaller are the quantities of heat that have to be conveyed to the external surface of the mixing chamber wall area 24 that is at risk of icing in order to cause layers of snow or ice accumulated on an internal surface of the mixing chamber wall area 24 to flake off.

Figure 2:
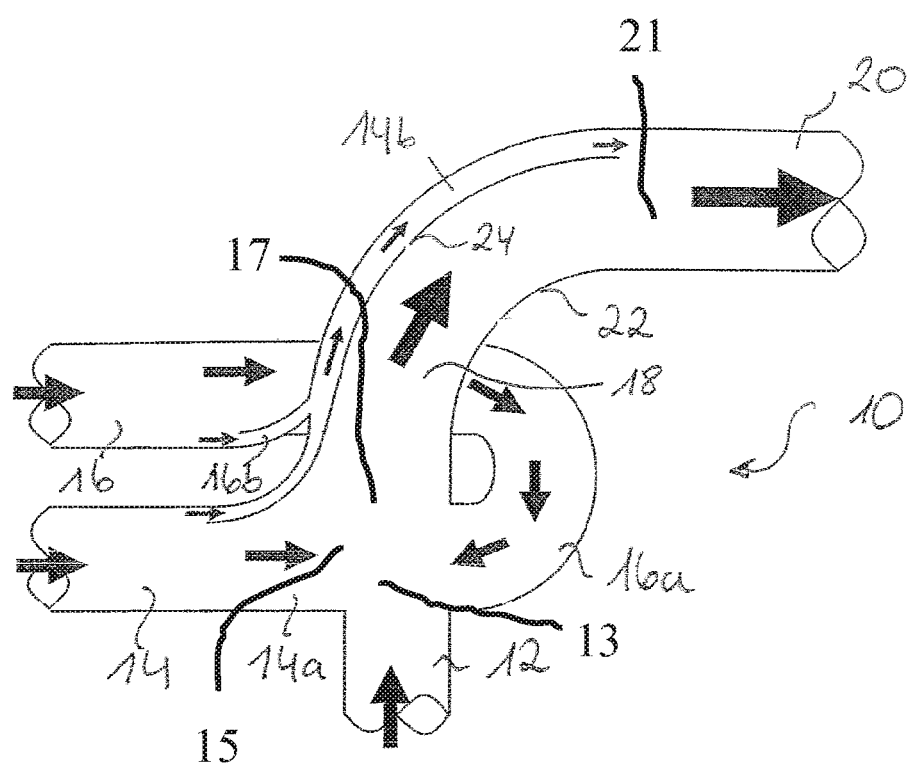
FIG. 2 shows a second embodiment of a mixing device suitable for use in an aircraft air-conditioning system.

The mixing device 10 shown in FIG. 2 differs from the arrangement according to FIG. 1 in that it comprises a second recirculation air supply line 16 as well as a first recirculation air supply line 14. Where the first recirculation air supply line 14 is adapted to supply recirculation air to the mixing device 10 from a first climate zone of an air-conditioned area of the aircraft, e.g., a freight compartment, a passenger cabin or a section of the passenger cabin, the second recirculation air supply line 16 is adapted to supply recirculation air to the mixing device 10 from a second climate zone of the area of the aircraft that is to be air-conditioned, e.g., a freight compartment, a passenger cabin or a section of the passenger cabin.

Like the first recirculation air supply line 14, the second recirculation air supply line 16 is also connected to the mixing chamber 18 of the mixing device 10. In particular, the second recirculation air supply line 16 has a main portion 16a that leads into the mixing chamber 18 in the region of the upstream end 17 of the mixing chamber 18, adjacent to the outlet of the cold air supply line 12 into the mixing chamber 18.

The heat transfer portion 14b of the first recirculation air supply line 14 is connected to the second recirculation air supply line 16 via a coupling portion 16b that branches off the main portion 16a of the second recirculation air supply line 16. Consequently, recirculation air is fed to the heat transfer portion 14b of the first recirculation air supply line 14 not only from the first recirculation air supply line 14, but also from the second recirculation air supply line 16. The first recirculation air supply line 14 may act as a main supply line for supplying the heat transfer portion 14b of the first recirculation air supply line 14 with recirculation air, and the second recirculation air supply line 16 may act as a back-up which is only utilized for supplying the heat transfer portion 14b of the first recirculation air supply line 14 with recirculation air when the first recirculation air supply line 14 is not supplying a sufficient amount of recirculation air.

Alternatively, the second recirculation air supply line 16 may act as a main supply line for supplying the heat transfer portion 14b of the first recirculation air supply line 14 with recirculation air, and the first recirculation air supply line 14 may act as a back-up which is only utilized for supplying the heat transfer portion 14b of the first recirculation air supply line 14 with recirculation air when the second recirculation air supply line 16 is not supplying a sufficient amount of recirculation air. Finally, it is also conceivable to supply the heat transfer portion 14b of the first recirculation air supply line 14 continuously, or in certain operating phases of the mixing device 10, with recirculation air from the first and second recirculation air supply lines 14, 16. In other respects the structure and mode of functioning of the mixing device 10 shown in FIG. 2 correspond to the structure and mode of functioning of the arrangement according to FIG. 1.

Figure 3:
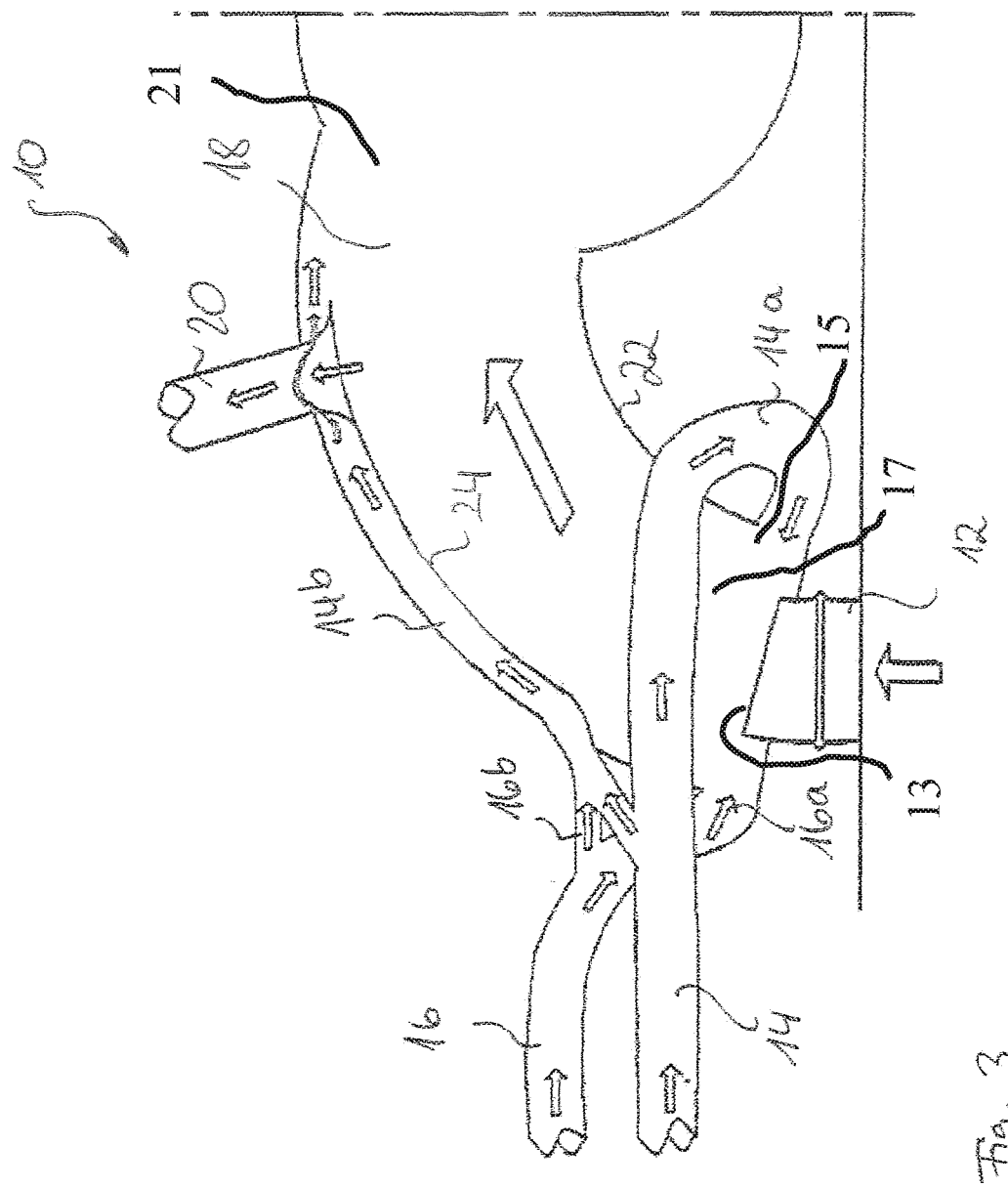
FIG. 3 shows a third embodiment of a mixing device suitable for use in an aircraft air-conditioning system.

Finally, FIG. 3 shows a mixing device 10 which differs from the arrangement according to FIG. 2 in that the mixed air exhaust line 20 passes through the heat transfer portion 14b of the first recirculation air supply line 14 upstream of its outlet into the mixing chamber 18. Consequently, the recirculation air flowing through the heat transfer portion 14b of the first recirculation air supply line 14 flows around the mixed air exhaust line 20 in the region where it branches off the mixing chamber 18, so, like the mixing chamber wall area 24 that is at risk of icing, the mixed air exhaust line 20 is heated by heat transfer from the recirculation air flowing through the heat transfer portion 14b of the first recirculation air supply line 14. In other respects the structure and mode of functioning of the mixing device 10 shown in FIG. 3 correspond to the structure and mode of functioning of the arrangement according to FIG. 2.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A mixing device for use in an aircraft air-conditioning system, comprising:
    a cold air supply line adapted to supply cold air to the mixing device,
    a first recirculation air supply line adapted to supply recirculation air to the mixing device, and
    a mixing chamber having an upstream end and a downstream end, the mixing chamber adapted to mix the cold air supplied to the mixing device via the cold air supply line with the recirculation air supplied to the mixing device via the first recirculation air supply line,
    wherein the first recirculation air supply line has a heat transfer portion which is thermoconductively connected to a mixing chamber wall delimiting the mixing chamber, and
    wherein the heat transfer portion of the first recirculation air supply line branches off a main portion of the first recirculation air supply line at a branch-off,
    wherein the main portion of the first recirculation air supply line has an outlet leading into the mixing chamber at the upstream end of the mixing chamber and adjacent to an outlet of the cold air supply line where the cold air supply line leads into the mixing chamber,
    wherein the heat transfer portion of the first recirculation air supply line extends along the mixing chamber from the outlet of the main portion of the first recirculation air supply line to the downstream end of the mixing chamber, the downstream end being disposed downstream of the outlet of the main portion of the first recirculation air supply line into the mixing chamber.

2. The mixing device according to claim 1, wherein the mixing chamber wall includes a curved portion that intersects with a linear path of the cold air from the cold air supply line such that the cold air impinges directly on the curved portion, and wherein the heat transfer portion of the first recirculation air supply line is arranged adjacent to the curved portion of the mixing chamber wall.

3. The mixing device according to claim 1, wherein a mixed air exhaust line connected to the mixing chamber passes through the heat transfer portion of the first recirculation air supply line.

4. The mixing device according to claim 1, further comprising a second recirculation air supply line adapted to supply recirculation air to the mixing device, the second recirculation air supply line being connected to the mixing chamber, the second recirculation air supply line comprising a main portion and a coupling portion connected to the heat transfer portion of the first recirculation air supply line.

5. The mixing device according to claim 4, wherein the main portion of the second recirculation air supply line leads into the mixing chamber in the region of the upstream end of the mixing chamber and adjacent to the outlet of the cold air supply line where the cold air supply line leads into the mixing chamber.

6. A method of operating a mixing device that is particularly suitable for use in an aircraft air-conditioning system, comprising the steps:
    supplying cold air into a mixing chamber of the mixing device via a cold air supply line, the mixing chamber having an upstream end and a downstream end,
    supplying recirculation air into the mixing chamber of the mixing device via a first recirculation air supply line at the upstream end of the mixing chamber, and
    mixing of the cold air supplied to the mixing device via the cold air supply line with the recirculation air supplied to the mixing device via the first recirculation air supply line in the mixing chamber,
    heating a mixing chamber wall delimiting the mixing chamber by heat transfer with a heat transfer portion of the first recirculation air supply line which is thermoconductively connected to the mixing chamber wall, and
    wherein the heat transfer portion branches off a main portion of the first recirculation air supply line at a branch-off,
    wherein the supply of recirculation air from the main portion of the first recirculation air supply line into the mixing chamber takes place from an outlet of the main portion of the first recirculation air supply line at the upstream end of the mixing chamber and adjacent to an outlet of the cold air supply line into the mixing chamber, and
    wherein the heat transfer portion of the first recirculation air supply line extends along the mixing chamber from the outlet of the main portion of the first recirculation air supply line to the downstream end of the mixing chamber, the downstream end being disposed downstream of the outlet of the main portion of the first recirculation air supply line into the mixing chamber.

7. The method according to claim 6, wherein the mixing chamber wall is heated by heat transfer from the heat transfer portion of the first recirculation air supply line that is arranged adjacent to an external surface of the mixing chamber wall.

8. The method according to claim 6, wherein a mixed air exhaust line connected to the mixing chamber is heated by heat transfer from the heat transfer portion of the first recirculation air supply line, the mixed air exhaust line passing in particular through the heat transfer portion of the first recirculation air supply line.

9. The method according to claim 6, wherein recirculation air is supplied to the heat transfer portion of the first recirculation air supply line from a second recirculation air supply line, the supply of the recirculation air from the second recirculation air supply line into the heat transfer portion of the first recirculation air supply line taking place via a coupling portion that branches off a main portion of the second recirculation air supply line.

10. The method according to claim 9, wherein the supply of recirculation air from the main portion of the second recirculation air supply line into the mixing chamber takes place in the region of the upstream end of the mixing chamber, adjacent to the outlet of the cold air supply line into the mixing chamber.

11. An aircraft air-conditioning system including a mixing device comprising:
    a cold air supply line adapted to supply cold air to the mixing device, a first recirculation air supply line adapted to supply recirculation air to the mixing device, and a mixing chamber having an upstream end and a downstream end, the mixing chamber adapted to mix the cold air supplied to the mixing device via the cold air supply line with the recirculation air supplied to the mixing device via the first recirculation air supply line, wherein the first recirculation air supply line has a heat transfer portion which is thermoconductively connected to a mixing chamber wall delimiting the mixing chamber, and wherein the heat transfer portion of the first recirculation air supply line branches off a main portion of the first recirculation air supply line at a branch-off, wherein the main portion of the first recirculation air supply line has an outlet leading into the mixing chamber at the upstream end of the mixing chamber and adjacent to an outlet of the cold air supply line where the cold air supply line leads into the mixing chamber, and wherein the heat transfer portion of the first recirculation air supply line extends along the mixing chamber from the outlet of the main portion of the first recirculation air supply line to a downstream end of the mixing chamber, the downstream end being disposed downstream of the outlet of the main portion of the first recirculation air supply line into the mixing chamber.

* * * * *